May 9, 1950  R. N. WALLACH ET AL  2,506,656
AIR CONDITIONER
Filed Oct. 15, 1945  2 Sheets-Sheet 1

INVENTORS
ROGER N. WALLACH, DECEASED
BY GEORGE S. HILLS, ADMINISTRATOR
AND JUSTIN ZENDER
BY Worth Wade
ATTORNEY

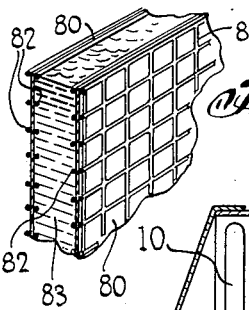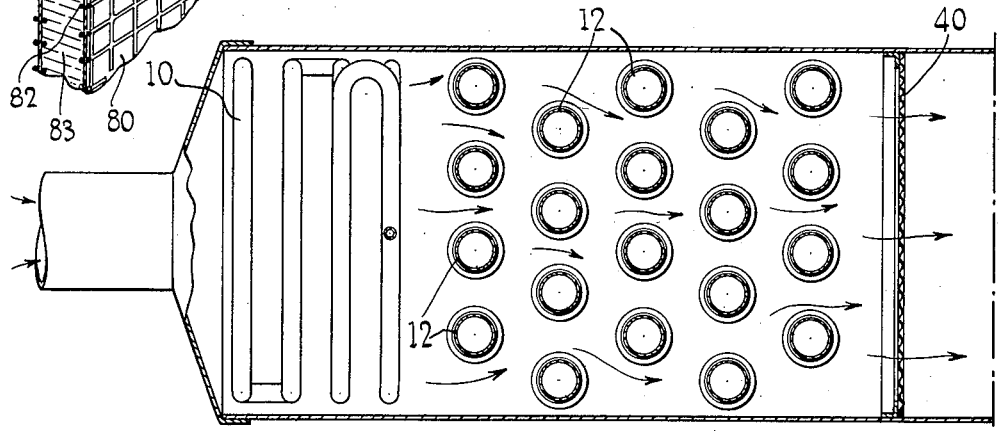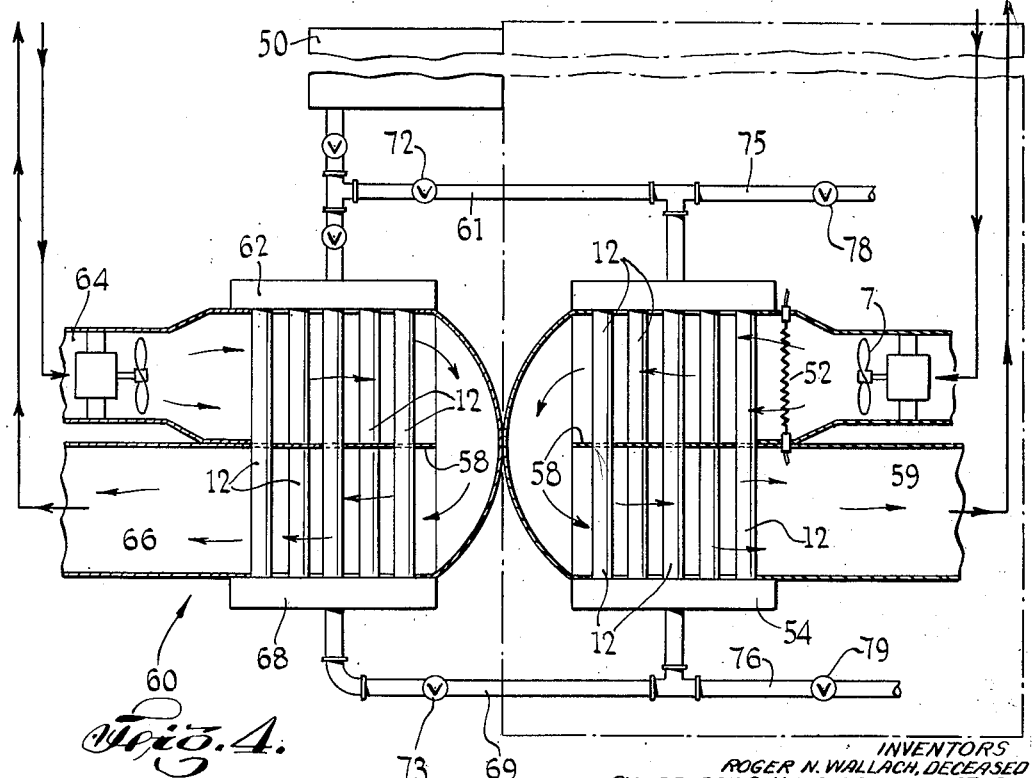

Patented May 9, 1950

2,506,656

UNITED STATES PATENT OFFICE 2,506,656

AIR CONDITIONER

Roger N. Wallach, deceased, late of Briarcliff Manor, N. Y., by George S. Hills, administrator, New Rochelle, and Justin Zender, Ardsley, N. Y., assignors, by mesne assignments, to American Viscose Corporation, Wilmington, Del., a corporation of Delaware Application October 15, 1945, Serial No. 622,440

2 Claims. (Cl. 261—97)

This invention relates to air conditioning and more particularly to an apparatus which is adapted to function either as a humidifier or as a dehumidifier, as desired.

In accordance with this invention, an air-conditioning apparatus is provided which may function either as a humidifier or as a dehumidifier, as desired. When used as a humidifier, the apparatus introduces water vapor directly into the air stream. When operated as a dehumidifier, water vapor is continuously absorbed from the air stream into a liquid composition which is adapted to be readily concentrated at a point spaced from the point of absorption of moisture and thence recirculated through the apparatus.

This is accomplished by the following process which the apparatus performs as one embodiment of the invention: One surface of a semi-permeable membrane is contacted with an aqueous medium, while the opposite surface of the membrane is contacted with the atmosphere being humidified or dehumidified, as the case may be. When it is desired to humidify the air, water is circulated as the aqueous medium. Water diffuses through the membrane to its opposite surface and volatilizes there, passing directly into the atmosphere as vapor without the formation of water droplets which would collect on and corrode metal parts in the room, which is a disadvantage of most humidifying systems heretofore used. When it is desired to dehumidify the air, an aqueous hygroscopic medium instead of pure water is circulated in contact with one side of the nonfibrous semi-permeable membrane. Water from the atmosphere diffuses through the membrane into the hygroscopic liquid and is there absorbed by the liquid. The diluted hygroscopic medium may be continuously removed, concentrated, and recirculated through the dehumidifier.

The air conditioner of the invention comprises a semi-permeable membrane, means for continuously passing an aqueous medium in contact with one side of the membrane, and means for passing a gaseous atmosphere in contact with the other side of the membrane. When the apparatus functions as a humidifier, means for heating the aqueous medium prior to contact with the membrane are preferably included. When the apparatus functions as a dehumidifier, means for cooling the hygroscopic medium prior to contact with the membrane and means for concentrating the hygroscopic medium after contact with the membrane prior to its recirculation are preferably included.

The expression "conditioning air with respect to humidity," as employed in the specification and claims, generically includes both adding and removing moisture vapor from the air. It, therefore, includes the processes of humidifying and dehumidifying the atmosphere being conditioned.

The expression "aqueous medium," as employed in the specification and claims, includes water, solutions of salts, and organic compounds in water, and hygroscopic organic compounds in a relatively pure state employed when the apparatus is to function as a dehumidifier. Such hygroscopic liquids, in general, have a minor quantity of water even when pure. The term also includes steam.

The expression "semi-permeable," as employed in the specification and claims, is intended to designate a membrane which is permeable to water but which does not leak.

Examples of materials of which the semi-permeable membrane may be made are regenerated cellulose or regenerated cellulose hydrate, such as those that may be produced by regeneration from viscose, cuprammonium cellulose, solutions of cellulose in inorganic or organic solvents, or those that may be produced by the denitration of nitrocellulose.

The preferred membrane is formed of nitrocellulose which has been denitrated until it is fully hydrophilic in property.

The drawings illustrate several embodiments of apparatus designed to carry out the process of the invention.

Figure 3 is a top cross-sectional view taken along the line 2—2 in Figure 2.

Figure 4 shows the apparatus of Figure 2 adapted to be used as a dehumidifier or as a humidifier, as desired.

Figure 5 illustrates the use of a semi-permeable membrane in the form of sheets.

Figure 1:
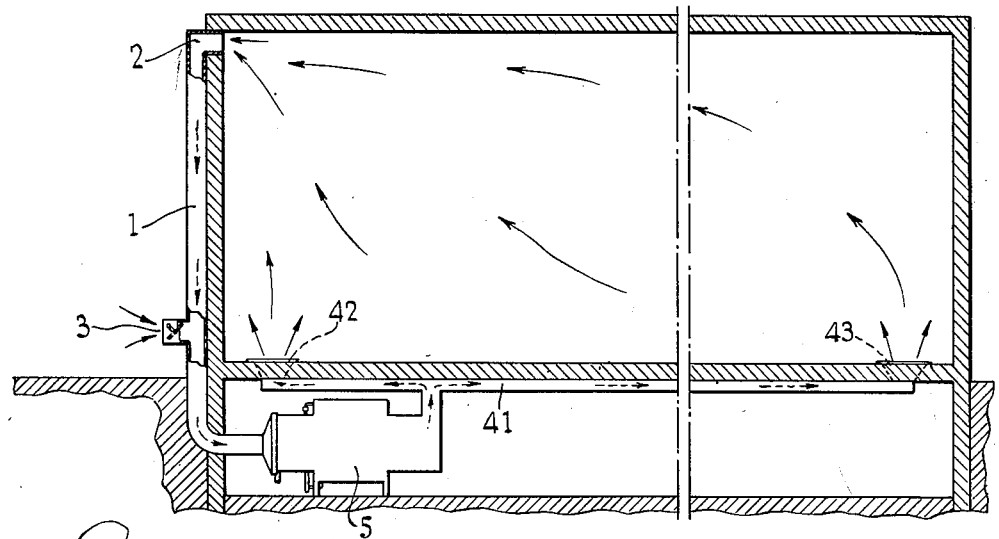
Figure 1 represents a cross-sectional elevation view of a room which is air-conditioned by an apparatus in accordance with the invention.
Figure 2:
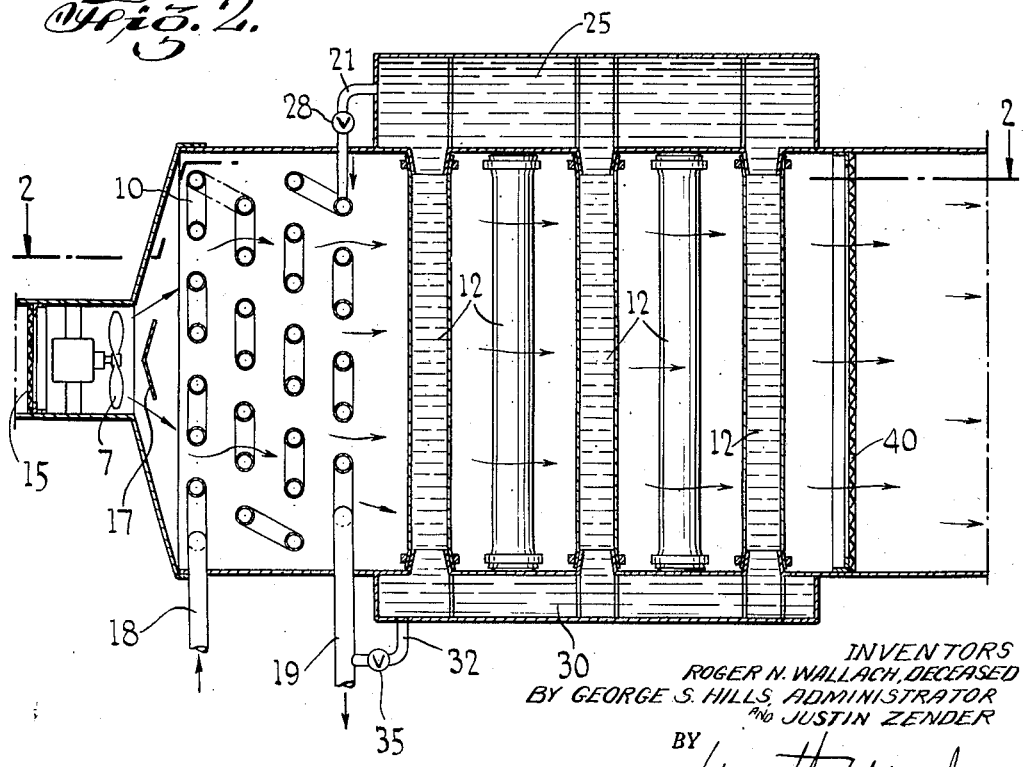
Figure 2 is an enlarged sectional view of the apparatus shown in Figure 1, adapted to be used as a humidifier.

The following discussion applies generally to Figures 1, 2, and 3:

A humidifier made in accordance with this invention is shown as set up in the basement of a typical industrial building. An outside duct 1, provided with an inside vent 2 drawing air from within the building and an outside vent 3 which mixes pure air with the air in the building in the degree desired, as controlled by a valve (not shown), furnishes air to the apparatus shown generally at 5. This apparatus includes an intake fan 7, heating coils 10, and the evaporating tubes 12, an essential feature of applicant's apparatus. These tubes are formed of a strong, semi-permeable membrane, such as cellophane.

Air enters the apparatus through the removable screen 15 which removes dirt and small particles and prevents unnecessary clogging of the apparatus with grease and grime. Impelled inward by the fan 7, the air is then directed in a flow throughout the chamber by the baffle 17 and is heated by passage over the heating coils 10. The heating coils shown in the apparatus are adapted to carry a flow of hot water drawn from a central heating plant elsewhere in the building. The hot water enters at the inlet 18 and emerges from the heating coils at the outlet 19. The cooled water is then carried back to the heating plant to be heated and recirculated as in any standard hot water heating system. If desired, this line may be merely a tap from the regular line supplying the hot water radiators in that section of the building.

A connection 21 is provided from the heating coil system to a supply tank or header 25 which is disposed over the evaporating tubes 12. The connection is provided with a valve 28 which regulates the flow of water from the heating system into the supply tank. This tank feeds water into the tubes, which are open at both ends. Water passes downwardly through the tubes into the lower tank or collecting header 30, which is likewise provided with a connection 32 to the outlet 19. This connection is provided with a valve 35, thus permitting a complete cut-off of the evaporating tube system from the heating system. This cut-off is essential, for example, when changing a tube.

The evaporating tube system is fed from the heating system for simplicity and greater efficiency. Since the water fed into the tubes in this way is still warm, or even hot, a higher rate of evaporation is achieved through the tubes. Furthermore, since the water in the tubes is hot, there is no appreciable cooling effect upon the air passing between them. When cold water is employed in the tubes, a large heat-loss is regularly sustained, thus rendering the heating system inefficient.

The tank 30 is open at the top so as to receive the water released when a tube suddenly breaks. Each tubing is preferably provided with a rider connected with the valves 28 and 35 which is held against the tube by a spring arrangement. When a tube accidentally bursts, the rider jumps and closes the connecting valves 28 and 35, thus preventing a possible flood.

The humidified and heated air then passes through a second removable screen 40 and is conducted by the duct 41 to various parts of the building where it is liberated through the vents 42 and 43, respectively.

Steam may also be employed as the aqueous medium. In this case, steam is continuously passed through the tubes as in the case of water, but the pressure of steam within the tubes is maintained greater than the pressure of the air on the other side of the tubes. This insures diffusion of water vapor through the tubes, thereby conditioning the air.

Use of steam permits coupling of the apparatus to a steam heating system where it is employed instead of hot water heating as illustrated in the drawing. It is more advantageous, where steam is employed to condition the air of the room, to employ the tube of the invention rather than liberate the steam directly into the room since this permits greater control of the rate of humidification and thereby prevents condensation of water vapor in the room being humidified.

When it is desired to have the apparatus function as a dehumidifier, in place of water a hygroscopic liquid capable of absorbing water from the atmosphere is passed in contact with the membrane. As such liquids, there may be employed any hygroscopic organic compounds which have this property, such as:

Glycerine
Glycols
    Ethylene glycol
    Diethylene glycol
    Triethylene glycol
Methylamine lactate
Ethylamine citrate
Butylamine tartrate
Amylamine formate
Urea malate
Proplyamine acetate
Tetramethylammonium hydroxide
Di (triethanolamine) monohydrogen phosphate
Di (monoethanolamine) monohydrogen phosphate
Di (amino propandiol 2.3) monohydrogen phosphate
Mono-triethanolamine malate
Di-triethanolamine malate Also, there may be employed aqueous solutions of salts which have the property of greatly lowering the vapor pressure of water when dissolved therein. In general, salts which may be used in an amount sufficient to lower the vapor pressure by at least 250 mm. at 100° C. are satisfactory. Such salt solutions include:

3M aluminum chloride
5M calcium chloride
4–5M calcium bromide
5–6M cobaltic nitrate
10M potassium acid carbonate
10M potassium iodide
6–8M potassium carbonate
8–10M lithium nitrate
4M strontium bromide
8–10M lithium chloride
7–10M lithium bromide
6–10M lithium iodide
4–5M magnesium chloride
4M magnesium bromide
8–10M sodium iodide
5M strontium chloride
8M sodium bromide in which M refers to "molar" concentrations.

Figure 4 shows an arrangement which permits dehumidifying or humidifying air, as desired. This is accomplished by connecting to a humidifier, as for example the apparatus shown in Figure 2, a second unit adapted to concentrate the hygroscopic medium after passage through the tubes.

A liquid, such as glycerine, which tends to absorb water from the air when confined within the permeable membrane is passed through the tubes 12. The glycerine is supplied from a storage tank 50. Humid air is passed into the apparatus in the manner as shown in Figure 1, being impelled by the fan 7 past an electric heating unit 52 into contact with the tubes. This heating unit need not of course be operated when the air is already warm. The medium passed through the tubes is preferably as cold as possible, since it must absorb the heat liberated when water vapor condenses to the liquid. This may be accomplished by placing ice in the lower header 54. This header differs from the lower tank shown in Figure 2 in that it is water-tight. The flow of glycerine solution through these tubes is upward, for convenience.

Water vapor in the air condenses upon the cold tubes 12 and diffuses through the membrane into the glycerine solution. The solution thus diluted is then passed into a concentrating apparatus shown generally at 60. The air, from which moisture has been removed, after passage twice around the tubes guided by the baffle 58, is liberated into the room again through the vent 59. The air is not heated in this apparatus, as in most dehumidifiers. It is cooled instead because of contact with the cold tubes 12. Thus, an additional apparatus for cooling the air after dehumidification is not required, as is the case with prior dehumidifiers.

In the concentrating apparatus shown at 60, diluted glycerine-water solution conducted from the dehumidifier by the connection 61 passes downward through the header 62 into the tubes 12, duplicates of the tubes in the dehumidifier. Air from the outside atmosphere is conducted into the apparatus through the duct 64, and, impelled into the apparatus by the fan 7, circulates twice past the surfaces of these tubes. During passage over the tubes 12 it picks up water vapor, thus concentrating and cooling the glycerine solution contained therein. The moist air is then liberated to the atmosphere through the vent at 66. The concentrated glycerine-water solution is collected in the header 68 and returned to the dehumidifier by the connection 69 for recirculation.

When it is desired to use the apparatus as a humidifier, the glycerine solution is replaced by water, the connecting pipes 61 and 69 are closed off by the valves 72 and 73, and the connections to the heating system 75 and 76 again made by opening the valves 78 and 79. The apparatus is then ready for use as described in connection with Figure 2.

Figure 5 illustrates the use of a semi-permeable membrane in the form of sheets, instead of tubes. The sheets 80 are each separated between two rigid sheets 82 of wire mesh. The circulating medium 83 employed is passed between the sheets in the manner shown in Figure 2 or Figure 4. Sheets offer less surface area than tubes, however, and tubes are therefore the preferred embodiment of the invention.

It has been found that the rate of evaporation of water through a hydrophilic membrane of the class described is substantially the same as, or in some cases is even greater than, the evaporation of water from the surface of the body of water, the air humidity, temperature and other conditions of the test being identical. It is important that the membrane be in a swollen gel state—that is, it must be a membrane that has never been dried but is still swollen with water as in its freshly produced but undried state.

The membrane does not appear to retard the evaporation of water in any way. The rate of evaporation of liquid between two vertically positioned sheet membranes is the same as if the liquid were resting in a pan and evaporation were taking place from both surfaces. Thus, in effect, the aqueous medium confined in a tubular membrane may be considered as a pillar of water, the evaporation being so efficient that for all practical purposes it may be considered that the membrane does not exist.

It is believed that this phenomenon is explainable by the following theory: Liquid water diffuses through the semi-permeable membrane to its opposite surface. There it forms a monomolecular film from which water vapor escapes into the atmosphere as rapidly as it diffuses through the membrane.

The rate of evaporation of water through the membranes may be varied by changing the operating conditions. The rate of evaporation may be greatly increased by heating the liquid which is in contact with the membrane, as well as heating the air stream which passes over the other side of the membrane. The temperature employed will depend upon the heat stability of the membrane itself and upon the temperature desired in the room or building being conditioned. The amount of humidification may be adjusted by changing the velocity of the air current which is blown over the surface of the membranes.

It is apparent from the above disclosure that the present apparatus has numerous advantages over prior humidifiers. Chief among these is its method of operation, which permits the introduction of water vapor instead of water droplets directly into the atmosphere. This avoids the difficulties which attend the removal of unevaporated droplets in standard humidifiers.

Moreover, this apparatus is absolutely silent in operation since it requires no moving parts beyond a simple fan. It has no moving parts to wear out. The flow of water does not require adjustment according to the humidity desired since the moisture picked up may be controlled by adjusting the rate of flow of air passing through the apparatus.

The apparatus also has numerous advantages over prior dehumidifiers. Chief among these is its simplicity of operation. It operates continuously to remove moisture from the air. The solution employed may be readily concentrated without appreciable expense. This avoids the necessity of maintaining duplicate sets of apparatus, one of which is continuously out of use because of the necessity of reactivating the dehumidifying material employed. Moreover, the rate of dehumidification is relatively slow so that by increasing or decreasing the number of tubes or sets of sheets used, the amount of moisture taken from the air may readily be controlled. There is no necessity of cooling the air after passage through the apparatus. Because the air is in contact with a cool membrane, it is cooled during passage in much the same way that air is heated during passage through heating coils.

We claim:
1. An air conditioner comprising a semi-permeable regenerated cellulose membrane in the wet gel state, means for continuously passing an aqueous medium in contact with one side of the membrane, means for passing a gaseous atmos- phere to be conditioned over the other side of the membrane, and means for screening dust and the like from the gaseous atmosphere before it reaches the membrane.

2. A process for conditioning air with respect to humidity which comprises continuously passing an aqueous hygroscopic medium in contact with one side of a semi-permeable regenerated cellulose membrane in the wet gel state through which water diffuses and continuously passing a gaseous atmosphere to be dehumidified over the other side of the membrane.

GEORGE S. HILLS,
*Administrator of the Estate of Roger N. Wallach, deceased.*
JUSTIN ZENDER.

REFERENCES CITED

The following references are of record in the file of this patent:

UNITED STATES PATENTS

| Number | Name | Date |
|---|---|---|
| 1,086,089 | Schou | Feb. 3, 1914 |
| 1,621,766 | Blumer | Mar. 22, 1927 |
| 1,883,024 | Smith | Oct. 18, 1932 |
| 2,009,550 | Harris | July 30, 1935 |
| 2,048,694 | Harris | July 28, 1936 |
| 2,064,225 | Schneider | Dec. 15, 1936 |
| 2,083,436 | Bothezat | June 8, 1937 |
| 2,110,286 | Harris | Mar. 8, 1938 |
| 2,386,826 | Wallach et al. | Oct. 16, 1945 |